United States Patent
Way

(10) Patent No.: US 7,024,112 B2
(45) Date of Patent: Apr. 4, 2006

(54) IN-BAND WAVELENGTH CONVERSION WAVELENGTH BUFFERING AND MULTI-PROTOCOL LAMBDA SWITCHING

(75) Inventor: Winston Way, Irvine, CA (US)

(73) Assignee: OpVista Incorporated, Irvine, CA (US)

(*) Notice: Subject to any disclaimer, the term of this patent is extended or adjusted under 35 U.S.C. 154(b) by 692 days.

(21) Appl. No.: 09/755,136

(22) Filed: Jan. 8, 2001

(65) Prior Publication Data
US 2006/0051092 A1 Mar. 9, 2006

Related U.S. Application Data

(60) Provisional application No. 60/231,577, filed on Sep. 11, 2000.

(51) Int. Cl.
*H04J 14/00* (2006.01)

(52) U.S. Cl. .......................................... 398/51; 398/54

(58) Field of Classification Search ................ 398/51, 398/48, 54, 47, 57, 79, 49; 370/389
See application file for complete search history.

(56) References Cited

U.S. PATENT DOCUMENTS

| | | | |
|---|---|---|---|
| 5,539,559 A * | 7/1996 | Cisneros et al. ............... | 398/51 |
| 5,617,233 A * | 4/1997 | Boncek ........................ | 398/51 |
| 5,663,820 A * | 9/1997 | Shiragaki ..................... | 359/128 |
| 5,838,475 A * | 11/1998 | Takeyari et al. .............. | 398/175 |
| 5,896,212 A * | 4/1999 | Sotom et al. ................. | 398/55 |
| 6,069,732 A | 5/2000 | Koch et al. | |
| 6,222,654 B1 * | 4/2001 | Frigo .......................... | 398/83 |
| 6,271,946 B1 * | 8/2001 | Chang et al. ................. | 359/124 |
| 6,466,342 B1 * | 10/2002 | Frigo et al. ................... | 359/127 |

OTHER PUBLICATIONS

J. Bannister et al., "How Many Wavelengths Do We Really Need? A Study of the Performance Limits of Packet Over Wavelengths", SPIE Optical Network Magazine, Apr. 2000.*

D. Blumenthal et al., "All-Optical Label Swapping with Wavelength Conversion for WDM-IP Networks with Subcarrier Multiplexed Addressing", IEEE Photonics Technology Letters, vol. 11, No. 11, Nov. 1999.*

O. Adamczyk et al., "All-Optical Output-Port Contention Resolution Using Subcarrier-Multiplexing", Optical Fiber Communication Conference 2000, Mar. 7-10, 2000.*

F. Masetti et al., "High-Speed, High Capacity ATM Optical switches for Future Telecommunication Transport Networks", IEEE Journal on Selected Areas in Communications, vol. 14, No. 5, Jun. 1996.*

J. Spring et al., "Photonic Header Replacement for Packet Switching", Electronics Letters, vol. 29, No. 17, Aug. 19, 1993.*

(Continued)

*Primary Examiner*—M. R. Sedighian
*Assistant Examiner*—Shi K. Li
(74) *Attorney, Agent, or Firm*—Fish & Richardson P.C.

(57) ABSTRACT

A method and device for wavelength conversion, wavelength buffering and label/header swapping. A wavelength buffer is used to provide for in-band wavelength conversion in, for example, a dense wavelength division multiplexing communications system. The same device may be used for label/header swapping without wavelength conversion.

22 Claims, 16 Drawing Sheets

OTHER PUBLICATIONS

H. Chao et al., "A Photonic Front-End Processor in a WDM ATM Multicast Switch", Journal of Lightwave Technology, vol. 18, No. 3, Mar. 2000.*

H. Sun et al., "Tunable Compensation of Dispersion-Induced RF Power Degradation in Multiple-Channel SCM Transmission by Nonlinearly-Chirped FBGs" CLEO '99, 1999.*

ITU-T Recommendation G.692, "Optical Interfaces for Mutlichannel Systems with Optical Amplifiers", Oct. 1998, pp. 14-23.*

M. Izutsu et al., "Integrated Optical SSB Modulation/ Frequency Shifter", IEEE Journal of Quantum Electronics, vol. QE-17, No. 11, Nov. 1981.*

Frowin Derr, D. et al., "An Optical Infrastructure for Future Telecommunications Networks", IEEE Communications Magazine, vol. 33, No. 11, Nov. 1995, pp. 84-88.

Okamoto, S. et al., "Optical Path Cross-Connect Systems For Photonic Networks", Global Telecommunications Conference, Nov. 1993, vol. 1, pp. 474-480.

Blumenthal, D.J. et al., "All-Optical Label Swapping With Wavelength Conversion For WDM-IP Networks With Subcarrier Multiplexed Addressing", IEEE Photonics Technology Letters, vol. 11, No. 11, Nov. 1999, pp. 1497-1499.

Ghani, N. "Lambda-Labeling: A Framework For IP-Over-WDM Using MPLS", Optical Networks Magazine, vol. 1, No. 2, Apr. 2000, pp. 45-58.

* cited by examiner

IN-BAND WAVELENGTH CONVERSION WAVELENGTH BUFFERING AND MULTI-PROTOCOL LAMBDA SWITCHING

This application claims priority from U.S. Provisional Patent Application No. 60/231,577, filed Sep. 11, 2000 and entitled "Optical Add/Drop Multiplexer and In-Band Wavelength Conversion".

BACKGROUND OF THE INVENTION

1. Field of the Invention

The present invention relates generally to a method and apparatus for wavelength conversion.

2. Description of Related Art and General Background

In an all-optical network, if two optical packets, each carried within the same wavelength range but on two different optical fibers, arrive simultaneously at an input of the optical switch, a wavelength conversion device may be used to change the wavelength of one of the packets so that both packets can be passed to a single output fiber without loss of either packet. Simultaneous arrival of packets can result in packet blocking and/or information loss, which can require a packet to be transmitted multiple times, thereby reducing the actual performance of a network much below the theoretical performance. In order to reduce the probability of packet blocking, it may be desirable to employ a wavelength conversion device. A wavelength conversion device can convert an optical signal from a first wavelength to a second wavelength within the optical network, thereby reducing problems with contention resolution.

Wavelength conversion may be all-optical, or it may make use of an optical receiver which provides an electrical signal to a tunable laser transmitter. All-optical wavelength conversion generally makes use of semiconductor optical amplifiers such as are disclosed in U.S. Pat. No. 6,069,732 to Koch et al.

Conventional wavelength conversion systems make use of out of band wavelength conversion, where "band" refers to, for example, a conventional International Telecommunication Union (ITU) window as used in dense wavelength division multiplexing (DWDM). (See, for example, ITU-T Recommendation G.692, Optical interfaces for multichannel systems with optical amplifiers, 10/1998). Such a window is generally between about 0.2 and 0.4 nm wide. Thus, in conventional wavelength conversion, in a DWDM system which encompasses several ITU windows from $\lambda 1$ to $\lambda 4$, a wavelength $\lambda 1$ will be converted to $\lambda 5$ or $\lambda 6$ (i.e. outside of the range $\lambda 1$ to $\lambda 4$) in order to resolve contention problems. This out of band conversion can result in difficulty with tracking converted packets. Moreover, if $\lambda 5$ is somewhat distant from $\lambda 1$, there will generally be a problem caused by low conversion efficiency.

SUMMARY OF THE INVENTION

Embodiments of the present invention address the needs identified above and others by providing a method including receiving a first packet of information on an input signal that occupies several input channels, each input channel included in one among an input plurality of wavelength ranges and transmitting the first packet of information on an output signal that occupies several output channels, each output channel included in one among an output plurality of wavelength ranges. The input channels include a reserved wavelength buffer and a channel on which the first packet is received. The output channels include an active wavelength buffer on which the first packet is transmitted and each among the input plurality of wavelength ranges is associated, in order of increasing wavelength with one among the output plurality of wavelength ranges in order of increasing wavelength, the wavelength range occupied by the reserved wavelength buffer being associated with the wavelength range occupied by the active wavelength buffer.

Another embodiment of the present invention includes a device having an optical receiver. The optical receiver is configured to receive an input optical signal having a first packet of information on an input optical signal that occupies a plurality of input channels, each input channel occupying one among an input plurality of wavelength ranges. The device also includes an optical transmitter, which is configured to transmit an output optical signal that occupies a plurality of output channels, each output channel included in one among an output plruality of wavelength ranges. The input channels include a reserved wavelength buffer and a channel on which the first packet is received. The output channels include an active wavelength buffer on which the first packet is transmitted. Each among the input range of wavelength portions is associated, in order of increasing wavelength, with one among the output range of wavelength portions in order of increasing wavelength, the wavelength range occupied by the reserved wavelength buffer being associated with the wavelength range occupied by the active wavelength buffer.

BRIEF DESCRIPTION OF THE DRAWINGS

The accompanying drawings, which are incorporated in and constitute a part of this specification illustrate an embodiment of the invention and together with the description, explains the objects, advantages, and principles of the invention.

DETAILED DESCRIPTION OF THE PREFERRED EMBODIMENTS

In the following description, for purposes of explanation and not limitation, specific details are set forth such as particular optical and electrical circuits, circuit components, techniques, etc. in order to provide a thorough understanding of the present invention. However, the invention may be practiced in other embodiments that depart from these specific details. In some instances, detailed descriptions of well-known devices and circuits may be omitted so as not to obscure the descriptions of the embodiments of the present invention with unnecessary details.

Certain aspects of the description make mention of use of optical single sideband (OSSB) modulation or double sideband modulation. One method of optical single sideband transmission is disclosed in U.S. Pat. No. 6,525,857 issued from U.S. patent application Ser. No. 09/575,811 of Way et al., filed May 22, 2000, entitled "Method and Apparatus for Interleaved Optical Single Sideband Modulation," and herein incorporated by reference. Other methods of optical single and double sideband modulation may be employed as appropriate.

Figure 1:
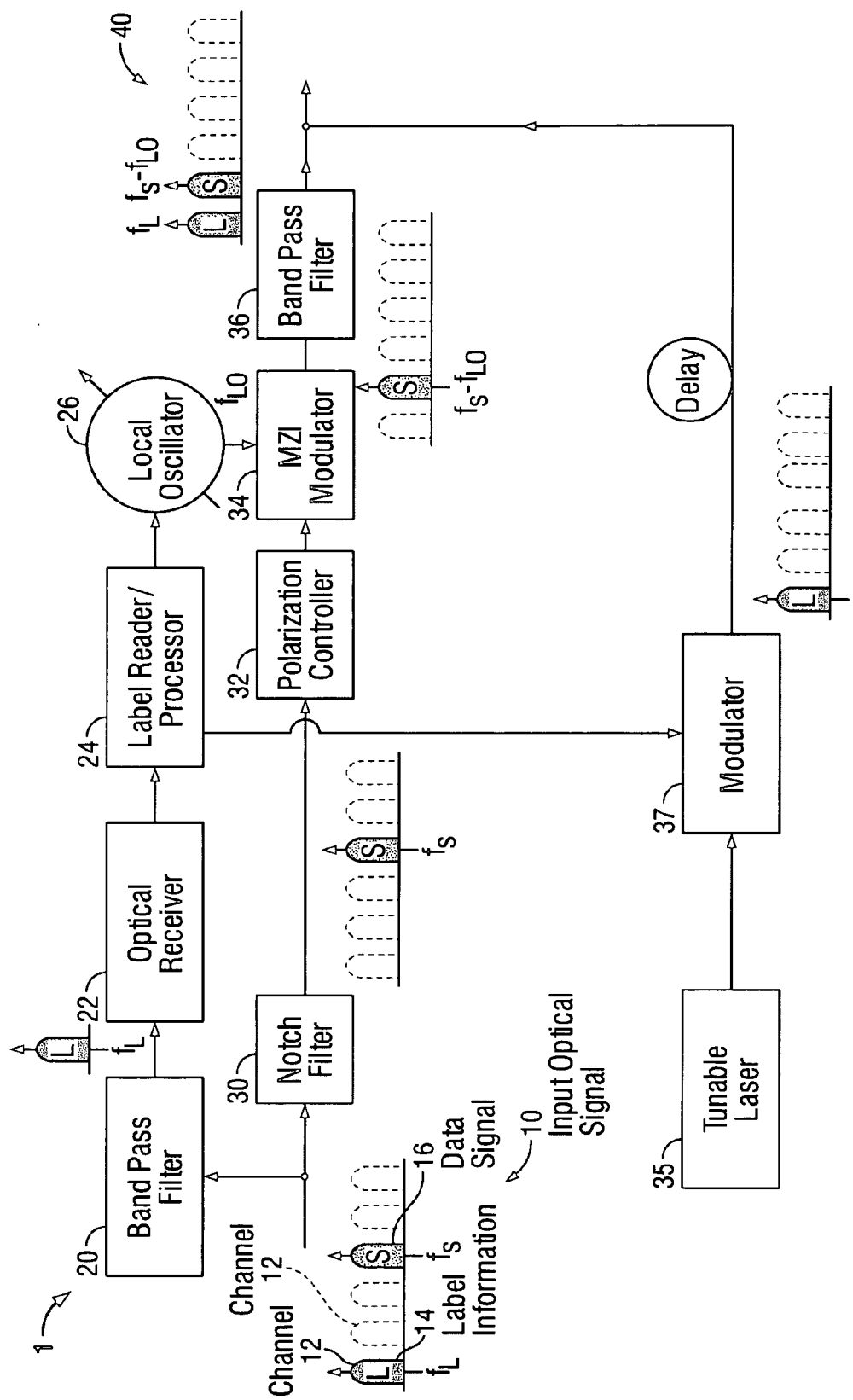
FIG. 1 is a schematic diagram showing a receiver/transmitter incorporating wavelength conversion according to an embodiment of the present invention.

Referring now to FIG. 1, a system 1 according to one embodiment of the present invention is shown. An input optical signal 10 is, for example, a wavelength division multiplexed signal occupying several channels 12, each channel being included in one of a plurality of distinct wavelength ranges. While a channel may generally occupy a range of wavelengths, it is also contemplated that a channel may effectively occupy only a single wavelength. For purposes of this disclosure channels will be discussed in terms of wavelength ranges though it should be understood that the disclosure includes single wavelength channels as well.

Figure 11A:
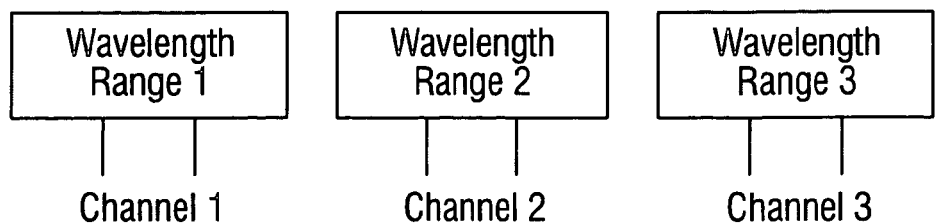
FIGS. 11a–d schematically show correspondences between input and output channels.
Figure 11B:
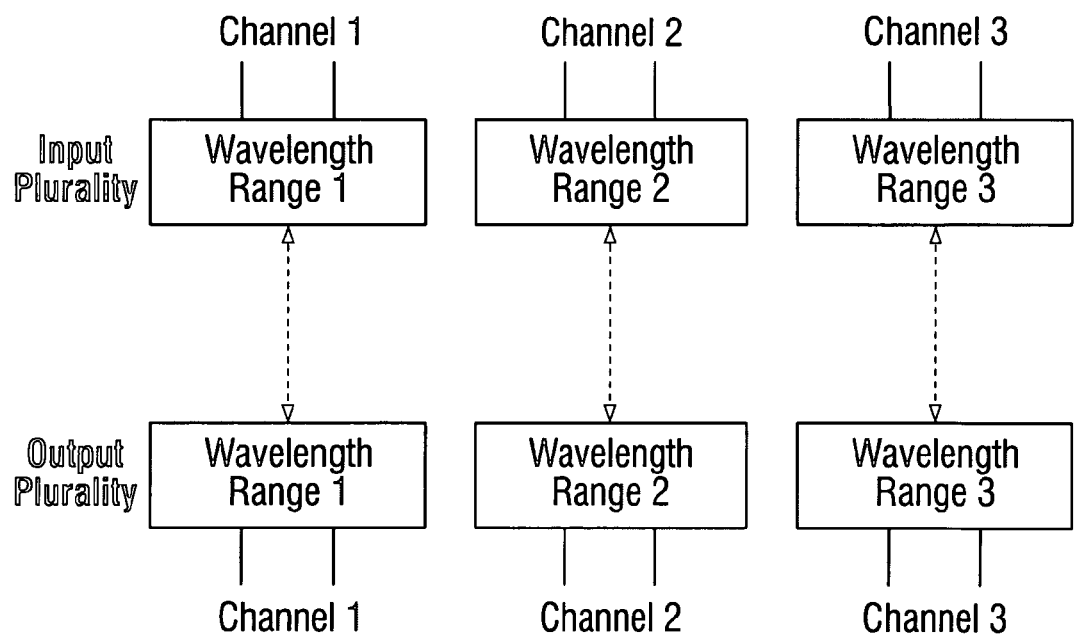

FIGS. 11a–d schematically show examples of several possible relationships between input and output channels. FIG. 11a shows a plurality of channels which are included within a corresponding plurality of wavelength ranges. Each of input channels 3, 2, and 1 correspond in order of increasing wavelength with a corresponding output channel 3, 2, 1. Note that though each range is shown with a gap between it and the neighboring range, it is contemplated that the ranges may not have any gap therebetween. FIG. 11b shows a plurality of input channels which correspond in wavelength to a plurality of output channels. In this case, there are no shifts in the channels between the input and output signals.

Figure 11C:
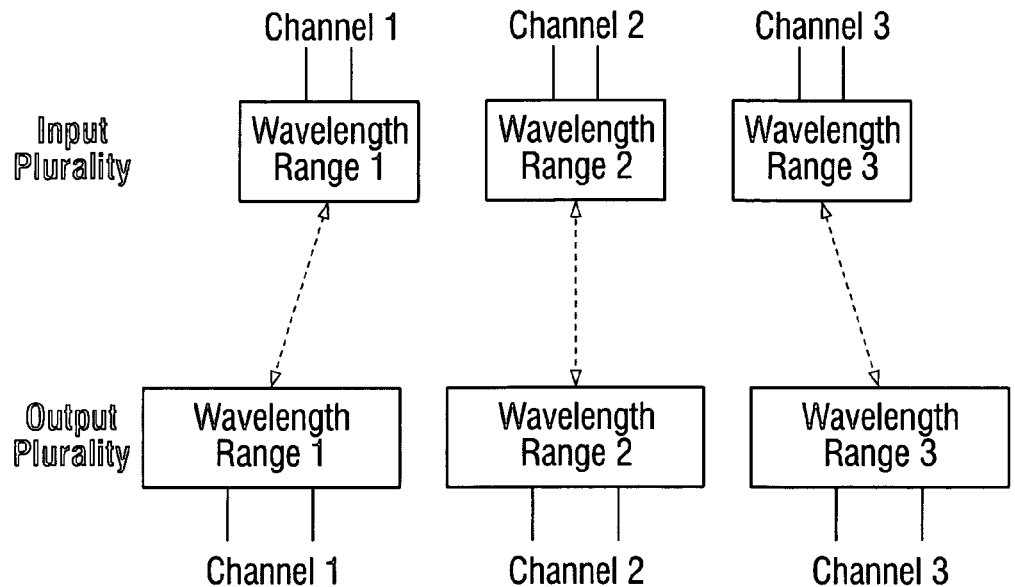
Figure 11D:
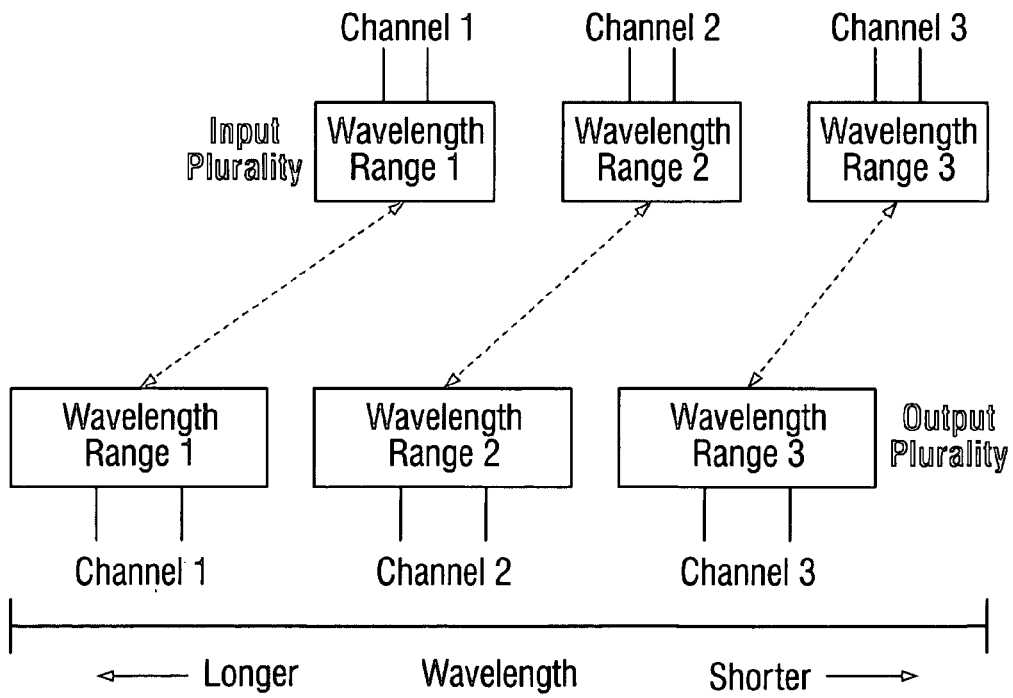

In contrast, FIG. 11c shows a plurality of input channels which correspond to a plurality of output channels which are wider and might be, for example, closer together. FIG. 11d shows a plurality of input channels which correspond to a plurality of output channels which are shifted longer in wavelength and are also wider and closer together. Though the longer wavelength channels are shown to overlap the shorter, it is contemplated that there might be no overlap at all. For example, an input signal received on a 1550 nm DWDM signal could be transmitted on a 1310 nm DWDM signal.

Label information 14 is carried in a label channel centered about a frequency $f_L$ and a data signal 16 which includes a packet of information, is carried in an input data channel which is centered about a frequency $f_S$.

While some applications have used a separate label channel for label information in the past, they make use of two general schemes. In the first scheme, one carrier is used, and the header and payload are detected as a single unit by one broadband detector. In the second scheme, the header information is carried on an adjacent ITU window, which means that the adjacent window is not carrying information at anywhere near its capacity as the header occupies bandwidth which could be better used for payload. By use of optical single sideband modulation of the header information, it can be easily placed on a separate carrier (in a separate channel) within one ITU window along with the payload data, for example as illustrated by the two signals 82 shown in FIGS. 5 and 6. That is, the optical single sideband modulation technique allows the data and header information to be separated but closely spaced and transmitted within a single window. This method of header transport allows the header information to be separately detected by use of a band pass filter to separate the header from the data and a baseband optical receiver may be used rather than a broadband receiver. Alternative modulation techniques may be used, provided they are capable of generating multiple separately modulated signals within a conventional ITU window.

At least one other channel of the input signal 10 remains empty and is reserved for future use and may be alternately referred to as a reserved channel or a wavelength buffer. The reserved channel has a central frequency $f_R$. In order to convert the input data channel to the reserved channel, the signal 10 is split into two arms of the system using an optical coupler, not shown. The optical coupler can be, for example, a 3-dB optical coupler and may be replaced by a circulator, particularly in the case that the signal is to be split into more than two arms as described below.

In the upper arm, the signal 10 passes through a band pass filter 20 to reject all channels except the label channel. An optical receiver 22 accepts the filtered signal and delivers it to a label reader/processor/writer 24. If the label reader/processor 24 determines that wavelength conversion is required, the label reader/processor 24 generates a control signal to control the conversion process. The control signal corresponds to the label information and is used to control a local oscillator 26, tuning it to an appropriate local oscillator frequency $f_{LO}$. The local oscillator frequency $f_{LO}$ is selected so that $f_S - f_{LO} = f_R$. In an alternate arrangement, rather than tuning a tunable local oscillator, a single local oscillator may be selected via their respective electronic switches from an array of local oscillators having different output frequencies.

As may be appreciated, the output signal may be shifted in frequency from the input signal. In this case, the output signal should still have a channel which corresponds to the wavelength buffer, though the frequency of the output active wavelength buffer may not be equal to the frequency of the input wavelength buffer.

In the lower arm of the system, the signal passes through a notch filter 30 which rejects the label channel from the signal, and passes only the data channel. A polarization controller 32 accepts the notch filtered signal and provides it to one input of a modulator 34. The local oscillator 26 provides a local oscillator signal at the frequency $f_{LO}$ to the AC electrode of the modulator 34. Since the output of the modulator 34 is generally dependent on the polarization of the input signal, a polarization controller 32 may be used to provide a fixed polarization signal to the modulator 34.

The modulator 34 is, for example, a Mach-Zender modulator. The modulator 34 may be biased at its minimum optical power point such that it serves as a second-order optical nonlinear device. In this arrangement, the output of the modulator 34 will be a signal including data in two channels at $(f_S \pm f_{LO})$. As can be appreciated from the above description, one data channel at $(f_s - f_{LO})$ will correspond to $f_R$, thus the data will have been converted from its initial channel $f_S$ to $f_R$ and wavelength conversion is achieved. It is also possible to use a band pass filter having a bandwidth equivalent to the width of the ITU window, while the extraneous data channel $(f_S + f_{LO})$ is located outside of the window by properly adjusting $f_{LO}$.

In order to remove the extraneous data channel at $(f_S + f_{LO})$, a band pass filter 36 which passes only $(f_S - f_{LO})$ is used. Likewise, a notch filter could be employed in place of band pass filter 36 to notch out the undesired channel. Use of a band pass filter 36 can eliminate other extraneous signals outside of the desired active wavelength buffer.

As may be clearly understood, the higher member, $(f_S + f_{LO})$, of the channel pair may alternately be used as the wavelength buffer with only an appropriate change in the selected $f_{LO}$, and any required change in the band pass filter 36.

Finally, the converted channel is added to new label information reflecting the conversion of the channel to produce an output signal 40. The new label signal may be produced with a tunable laser 35 set to the frequency of the label channel, $f_L$. The signal at $f_L$ is modulated with a new base band label at modulator 37, which is preferably a Mach-Zehnder interferometer amplitude modulator. The signal proceeds through a delay loop and is re-combined with the signal from the modulator 34 to form the output signal 40. The delay loop is configured to produce a delay which corresponds to the processing time of the upper arm of the system. Preferably, the new label information complies with standards on multiprotocol label swapping such as those promulgated by the Internet Engineering Task Force, including, for example, the Generalized MPLS—Signaling Function Description, currently in draft form available from ietf.org as an internet draft, "draft-ietf-mpls-generalized-signaling-00.txt".

One application for the label switching functions is in multi-protocol lambda switching (also variously known as MPlS, MPLmS and Optical MPLS). MPlS finds a particular use in optical networks using IP switching, allowing IP networking over DWDM systems which require IP addressing, label switching and wavelength switched optical networking functions.

Figure 2:
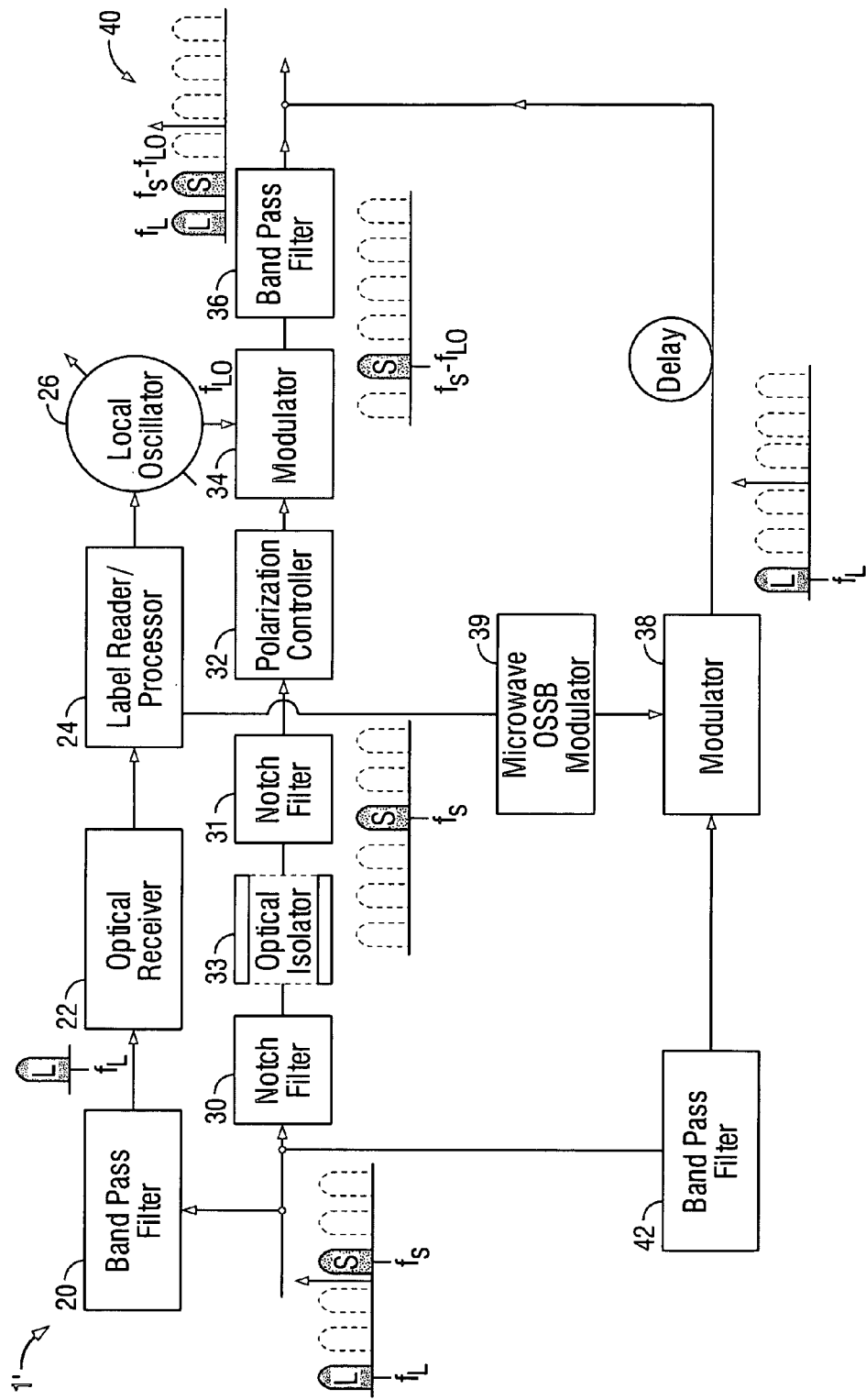
FIG. 2 is a schematic diagram showing a receiver/transmitter incorporating wavelength conversion according to another embodiment of the present invention.

FIG. 2 shows a device 1' according to an alternate embodiment of the present invention. In this device 1', the device uses the optical carrier from the input signal for the re-modulation of a new label signal. In each of the embodiments of FIGS. 1 and 2, the modulator 34 may be replaced with a semiconductor optical amplifier and the local oscillator may be replaced by a tunable pump laser which is controlled by the a control signal produced by label reader/processor 24. The control signal instructs the laser to produce an optical signal at a frequency $f_p$. Just as with the local oscillator signal, $f_p$ is preferably selected so that $(f_S - f_p)$ will correspond to $f_R$. Likewise as with the previous embodiment, $f_p$ could alternately be selected so that $(f_S + f_p)$ corresponds to $f_R$. This embodiment may also include a second notch filter 31 to remove the carrier. Between the two notch filters 30, 31, an optical isolator 33 is used to reduce problems associated with reflections between the two notch filters.

The semiconductor optical amplifier 34 accepts the signal from the laser 26 and the signal from the polarization controller 32 and optical four-wave mixing products are produced at $f_S \pm f_p$, just as with the modulator 34. Likewise, band pass filter 36 rejects extraneous signals and the label is modulated onto the output signal via a modulator 38 to produce an output signal 40, which is similar in form to the output signal 40 of FIG. 1. In a fast packet-switched network the band pass filter 36 can be a wideband, non-tunable filter. To re-supply the carrier signal, a third arm of the device includes a band pass filter 42 which rejects all channels except the carrier. A microwave OSSB modulator 39 is used to provide the modulated electrical signal by which modulator 38 remodulates the carrier. The signal including the carrier and label is re-combined with the signal from the upper two arms to form the output signal 40. One example of a modulator suitable for adding the label information back to the carrier signal is an optical single sideband modulator such as is discussed in Way et al., U.S. patent application Ser. No. 09/575,811, but may be any appropriate modulator. Note that if there is no optical carrier present in the input signal, then the new label can be added via a local tunable laser as shown in FIG. 1.

Figure 3A:
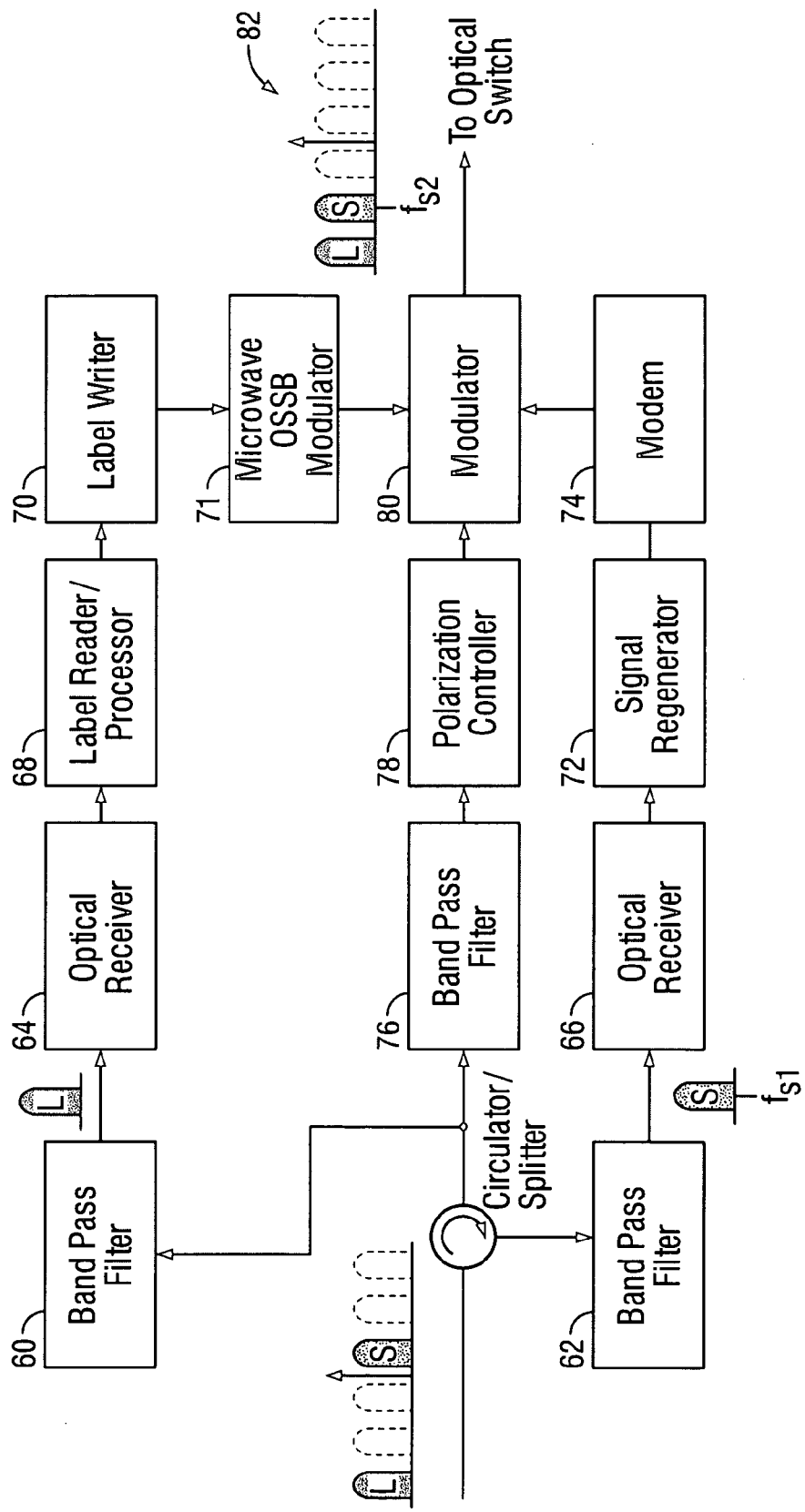
FIG. 3(a) is a schematic diagram showing a receiver/transmitter incorporating wavelength conversion according to yet another embodiment of the present invention.

A device according to a third embodiment of the present invention is shown in FIG. 3(a). In this device, the input signal, which has an optical carrier, is transmitted through a pair of band pass filters 60, 62. The circulator shown may be replaced with a 1×3 splitter if desired. The upper arm band pass filter 60 passes only the label channel, while the lower arm band pass filter 62 passes only the data channel. Each signal is received by a respective optical receiver 64, 66. The upper arm then forwards the received label information to a label reader/processor 68.

In the lower arm, the optical receiver 66 forwards the data signal to a signal regenerator 72, which preferably performs reamplifying, reshaping and retiming (3R) functions. The signal from the regenerator 72 is used to control a modem 74 which produces a signal at the frequency of the reserved channel $f_R$. The modem 74 can be, for example, a microwave OSSB modem.

Another band pass filter 76 is used to pass only the carrier signal. The carrier is then passed through a polarization controller 78 before arriving at a modulator 80 which modulates the carrier with the signal from the label writer 70 (which has passed through microwave OSSB modulator 71) and the regenerated signal from the modem 74. The modulated signal thus forms an output signal 82 which contains the information in the wavelength buffer and rewritten label information in a label channel.

Figure 3B:
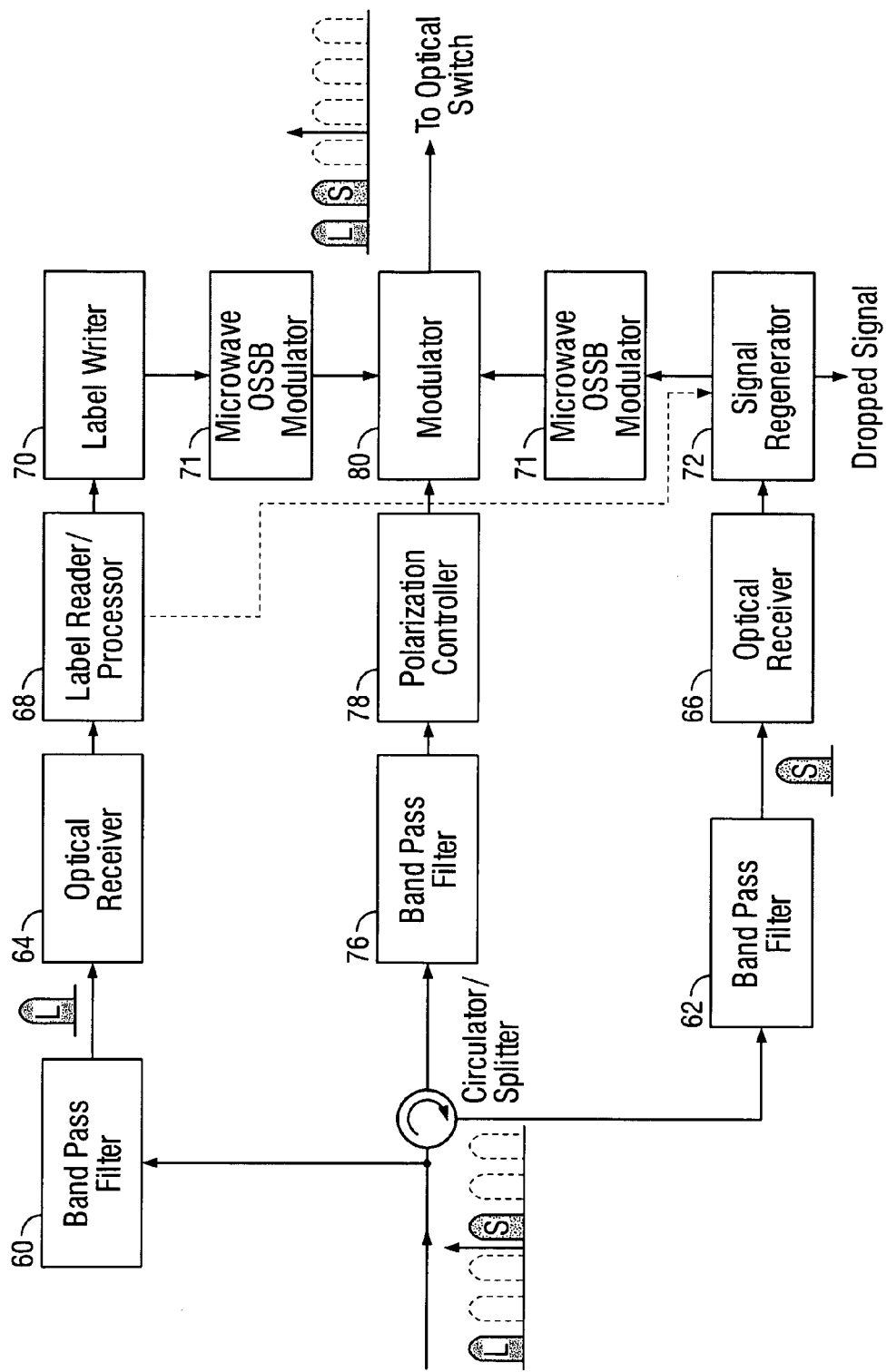
FIG. 3(b) is a schematic diagram showing an add/drop use of the receiver/transmitter of FIG. 3(a).

The wavelength converter of FIG. 3(a) may also be used as an add/drop as illustrated in FIG. 3(b). In this use, the regenerator 72 can drop the channel to be dropped and provide a new signal including channels to be added to the modulator 80. A control signal from the label reader/processor 68 instructs the tunable filter 62 on what channel to drop and at what frequency the new channel should be added. Since the regenerator is producing a clean and re-shaped signal, its output can be used to modulate the modulator 80 while part of the signal is simply dropped at the local node. In this embodiment as illustrated, the newly added signal is placed in a channel different from the dropped channel. As will be apparent to the reader, the newly added signal may likewise be transmitted within the same channel as the dropped signal.

Figure 4:
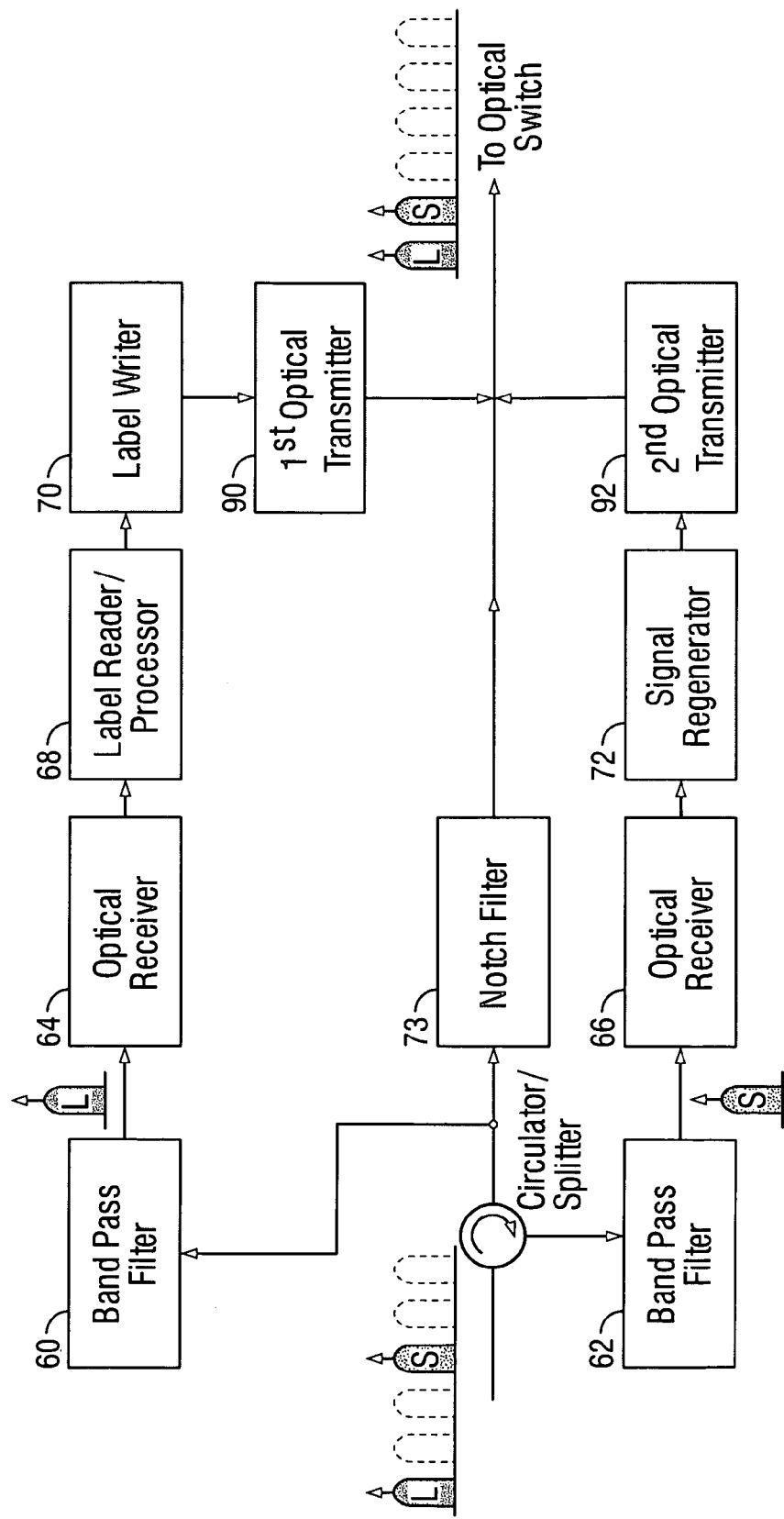
FIG. 4 is a schematic diagram showing a receiver/transmitter incorporating wavelength conversion according to yet another embodiment of the present invention.

A device according to a fourth embodiment is adapted for use with signals in which the carrier is not separate from the data. As can be seen in FIG. 3(a), the data channels are in side bands of the carrier signal. In contrast, as shown in FIG. 4, the data channels are not on side bands, but rather are carried directly on the carriers. To carry the data directly on the carriers, multiple laser sources are used to produce the signal, each laser signal is modulated with a signal representing the data to be carried on a corresponding channel.

In the device shown in FIG. 4, each of the label channel and the data channel are isolated by the use of a respective band pass filter 60, 62, just as in the device shown in FIG. 3. The label writer 70 produces a signal to control a first optical transmitter 90, while the signal regenerator 72 produces a regenerated signal to control a second laser 92. The signal passes through a notch filter 73, removing the incoming label and the signal to be regenerated. If there are no other input signals present, then the path including the notch filter 73 may be eliminated. However, if there is more than one input signal, the path including the notch filter 73 serves as the "through" path. The first optical transmitter 90 produces an optical signal centered about a frequency $f_L$, corresponding to the label channel, and modulated by the label information. The second optical transmitter 92 produces an optical signal centered about a second frequency $f_R$, corresponding to the reserved channel, and modulated by the data information.

Figure 5:
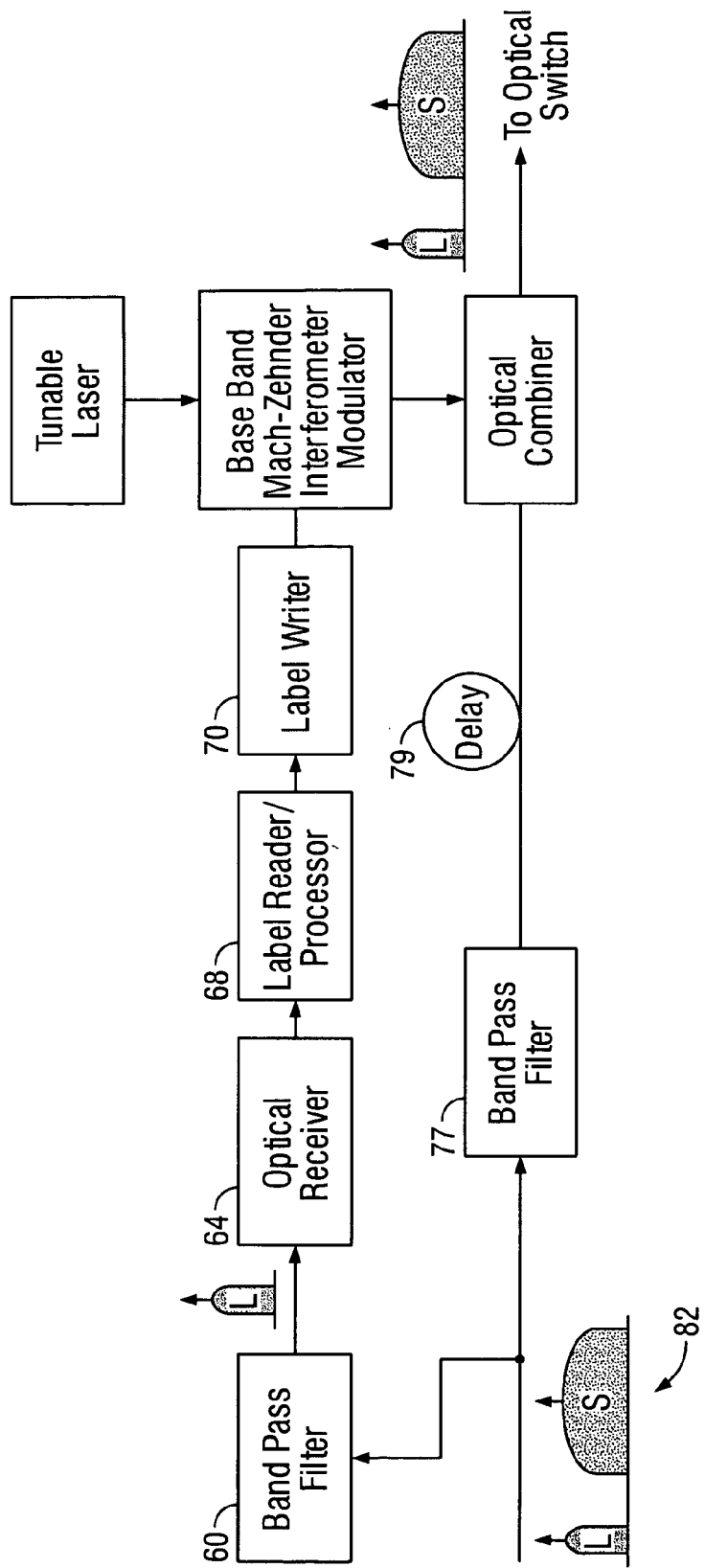
FIG. 5 is a schematic diagram showing a receiver/transmitter incorporating label swapping without wavelength conversion according to another embodiment of the present invention.
Figure 6:
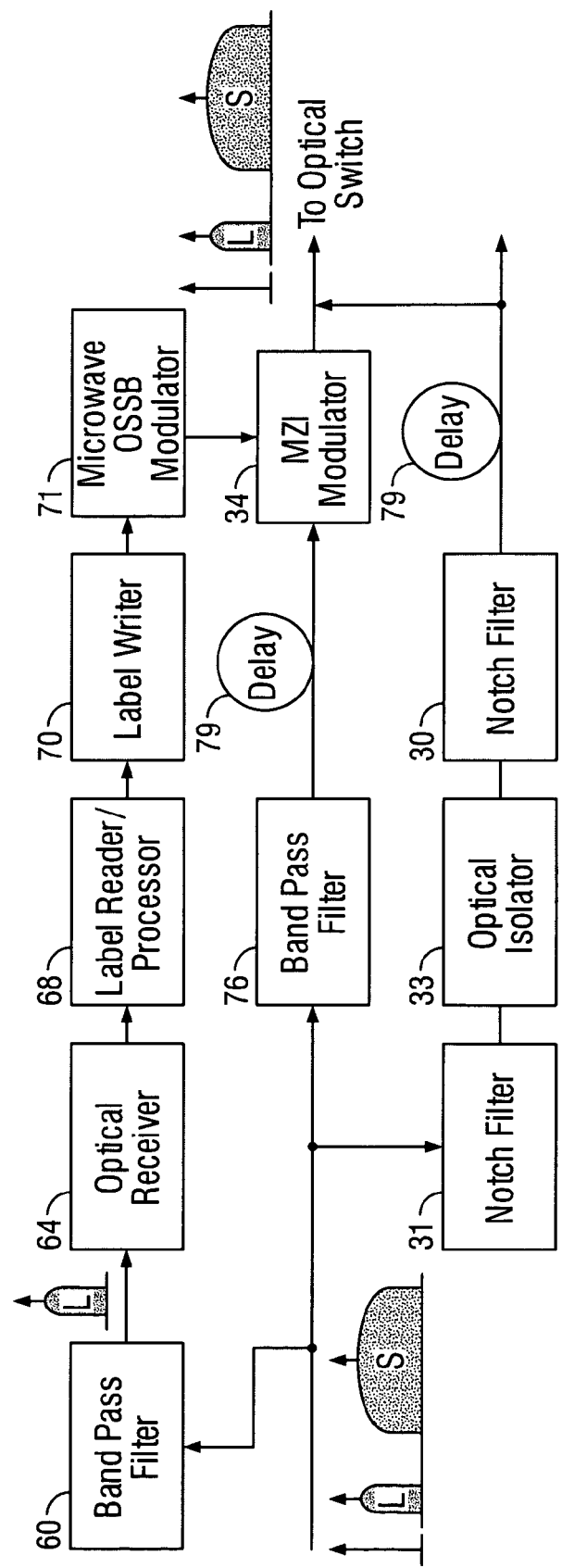
FIG. 6 is a schematic diagram showing a receiver/transmitter incorporating label swapping without wavelength conversion according to yet another embodiment of the present invention.

Another device according to an embodiment of the present invention may also have the ability to perform label swapping without any wavelength conversion. Label swapping is illustrated, for example, in FIGS. 5 (without an optical carrier present) and 6 (with an optical carrier present). According to this aspect of the invention, the upper arm includes several of the same components as are illustrated in the upper arm of the device shown in FIG. 1 or FIG. 2. In addition, the optical receiver 64 can be a base band optical receiver. To re-modulate the new label, the device shown in FIG. 5 uses a tunable laser and a base band Mach-Zehnder interferometer modulator, while the device of FIG. 6 uses a microwave OSSB modulator and an Mach-Zehnder interferometer modulator. Note that in the label swapping schemes shown in FIGS. 5 and 6, the modulation of the label and data take place on separate carriers within an ITU window, and no broadband detector to receive the label information is needed. In general, labels will pass more slowly through the upper arm than through the lower arm. To account for this, a delay line 79 may be included in the lower arms to ensure that the signals in the respective arms are synchronous. In FIG. 5, a bandpass filter 77 is used to reject the label channel "L" having the label information and passes the signal channel "S" having the data and an optical combiner is used to combine the signal channel "S" with the optical signal with the new label from the base band Mach-Zehnder interferometer modulator to produce the output signal to the optical switch.

Figure 7A:
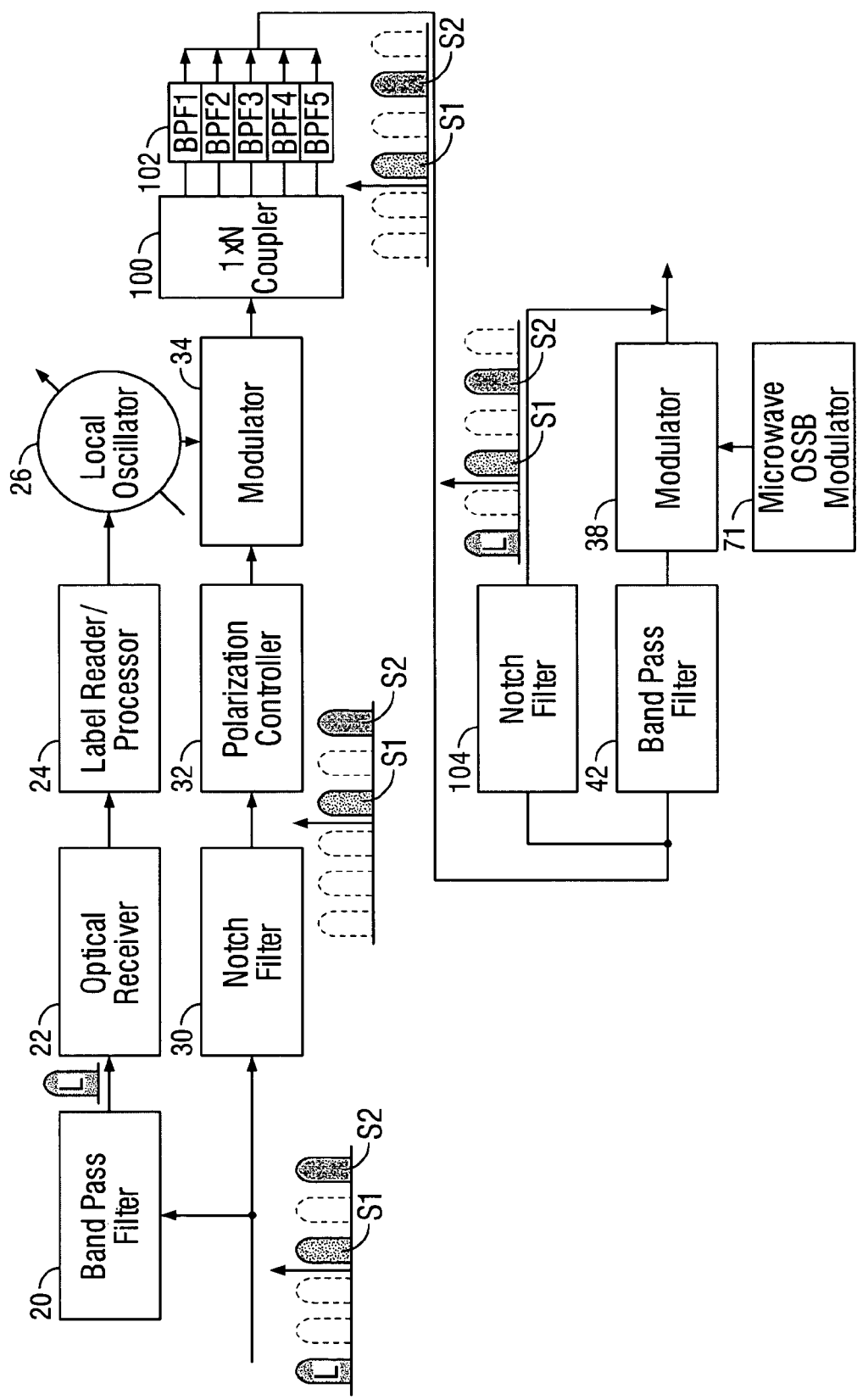
FIG. 7(a) is a schematic diagram showing a receiver/transmitter as in FIG. 1, for use in multiple channel applications, according to an embodiment of the present invention.
Figure 7B:
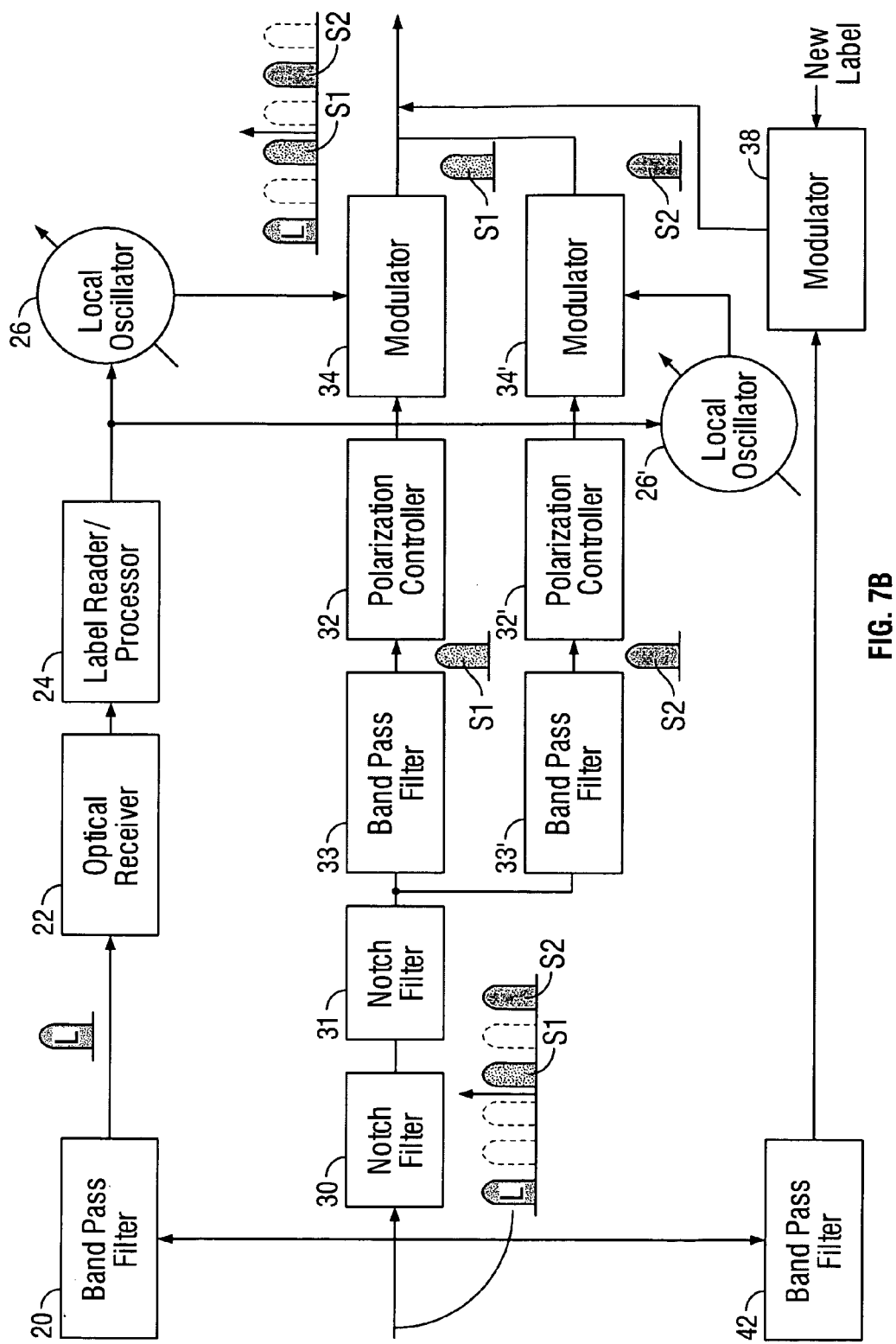
FIG. 7(b) is a schematic diagram showing a receiver/transmitter as in FIG. 2, for use in multiple channel applications, according to an embodiment of the present invention.

As can be seen in FIG. 7(a), a device similar to the one shown in FIG. 1 may be employed even if there is more than one initial data channel in the input signal. Likewise, FIG. 7(b) illustrates an alternate device which can be used to perform multiple channel conversions. The operation of the device shown in FIG. 7(a) is similar to that of the device of FIG. 1. Since a single modulator 34 is used to shift the two channels, each will be shifted in the same direction by the same amount $f_{LO}$. The two converted channels are selected using the band pass filter array 102 after they pass through the 1×N optical coupler 100. The shifted channels are remodulated along with the new label information from microwave OSSB modulator 71 to form an output signal. To effect the remodulation, two arms are used. A first arm contains a notch filter 104 which removes the carrier, while a second arm contains a band pass filter 42 which leaves only the carrier. The carrier is remodulated with the new label information, preferably using a single sideband modulator. The remodulated carrier is then re-combined with the signal from the upper arm to form the output signal.

To avoid loss of bandwidth after several cascaded stages of wavelength conversion switching nodes, the filter bandwidth of filters 102, 33 and 33' should in general be greater than a single channel pass band, while at the same time small enough to avoid adjacent channel interference. Consequently, when using the wavelength conversion technique presented here, there should be neighboring wavelength buffer preserved for the specific channel or channels to be converted.

In the alternate arrangement shown in FIG. 7(b) an additional branch is added which allows each of the shifted channels to be shifted by different amounts or in different directions. In this arrangement, the upper arm remains the same as is illustrated in FIG. 7(a). The lower arm is replaced by two lower arms each including a band pass filter 33, 33', a polarization controller 32, 32', a modulator 34, 34', and a local oscillator, 26, 26'. Likewise, the notch filter 30 may be supplemented with a notch filter 31 which removes the carrier from the signal. As can be understood from FIG. 7(b), the bandpass filter 33 selects the first channel while the bandpass filter 33' selects the second. Each signal then passes through its respective polarization controller 32, 32' and is modulated onto the carrier by a respective modulator 34, 34'. The two local oscillators are each tuned to an appropriate frequency $f_{LO}$ to shift the channels to $f_s \pm f_{LO}$ just as described above with respect to FIG. 1. Though not shown, a band pass filter can be used to eliminate the unwanted member of the channel pairs, in a manner similar as is used in the devices shown in FIGS. 1 and 2. The new signals are then modulated along with the new label in a third arm, as in FIG. 2, to form the output signal. Though the illustration in FIG. 7(b) shows each channel being shifted in the same direction by the same amount (i.e. one channel left) the device illustrated could just as easily be used to move one channel 1 to the left and the other 3 to the right, depending on which channels were empty and available for use. Moreover, though only two arms are shown for converting two channels, it may be understood that N arms could be used for converting N channels as desired or necessary.

Figure 7C:
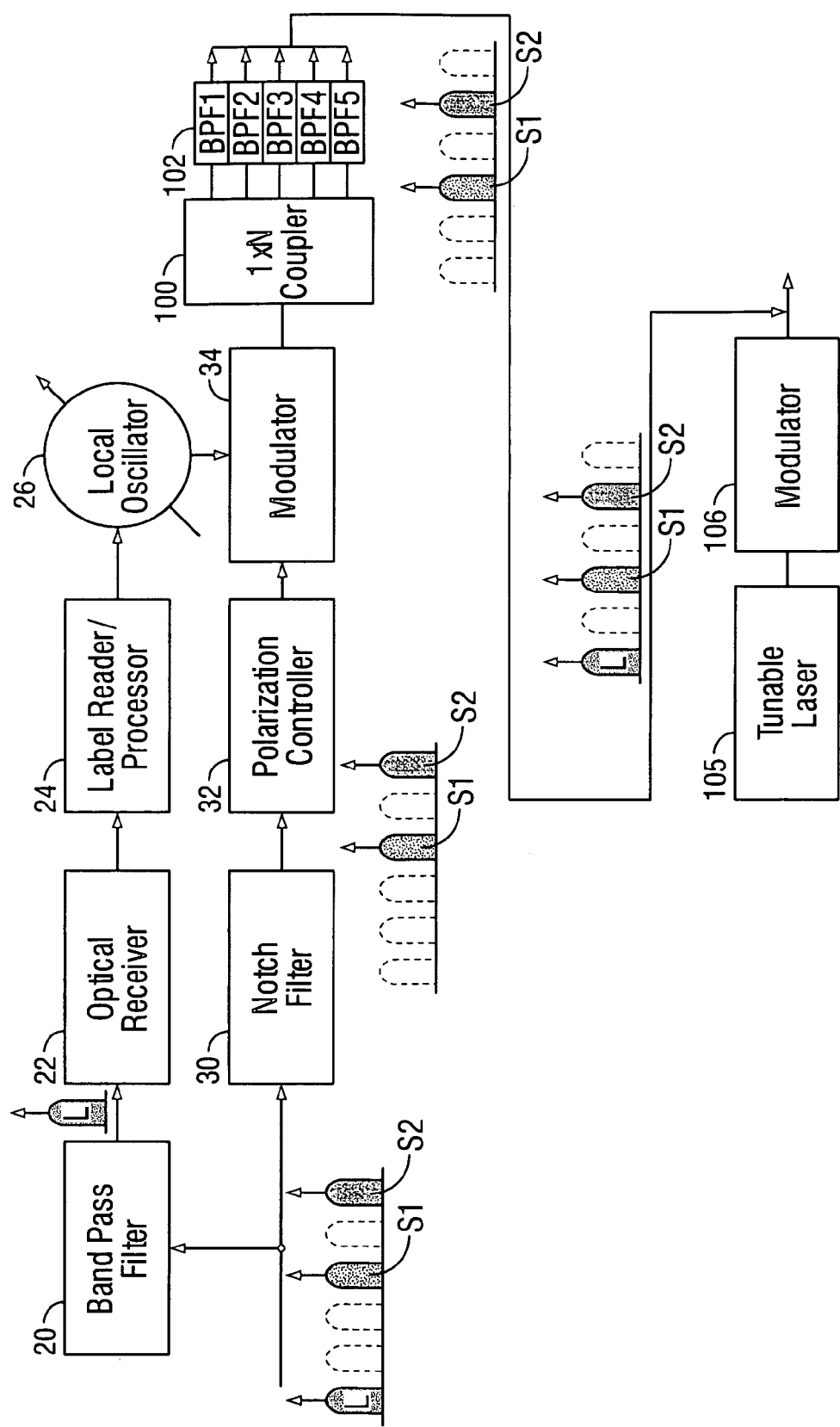
FIG. 7(c) is a schematic diagram showing a receiver/transmitter similar to that of FIG. 7(a).
Figure 7D:
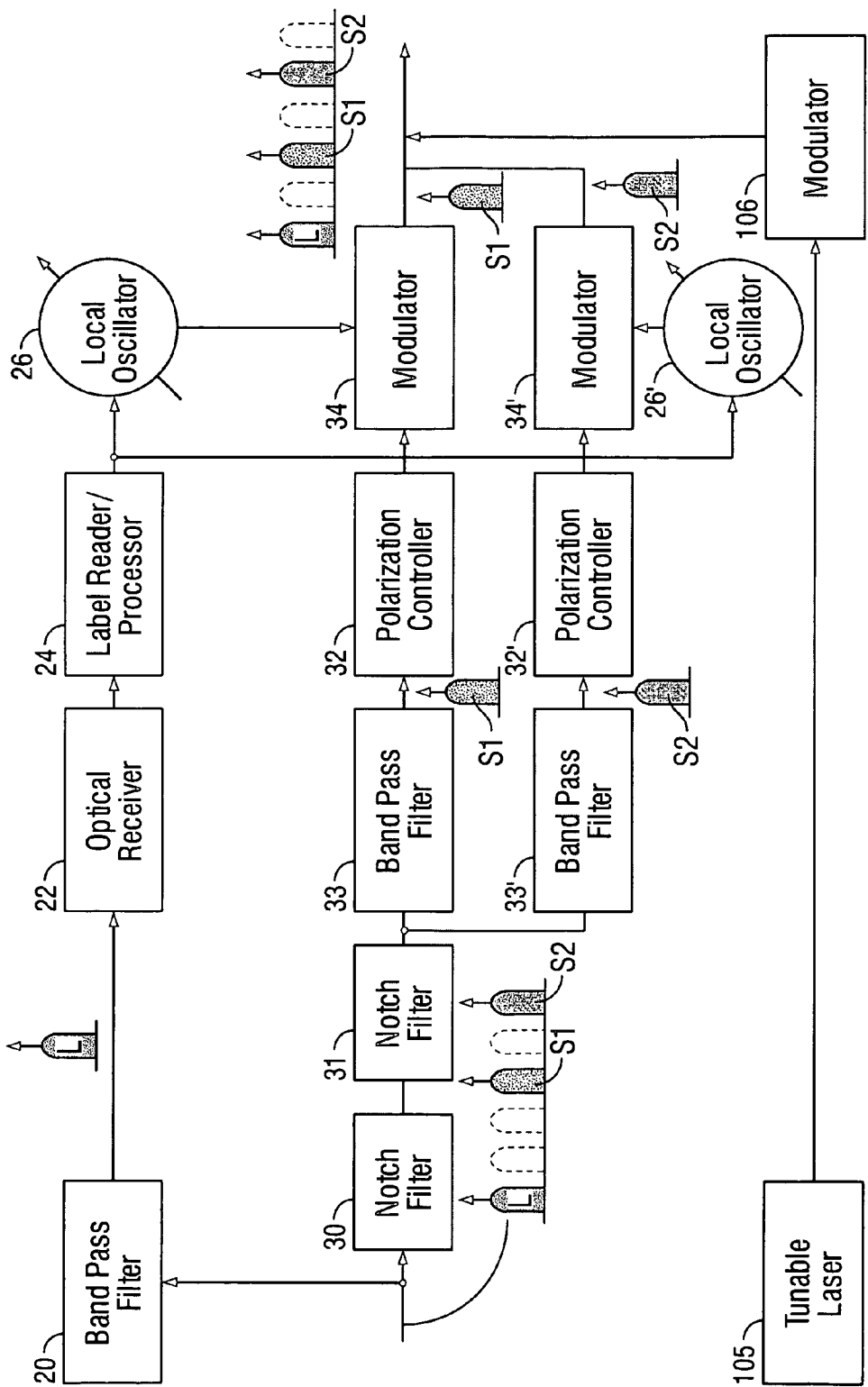
FIG. 7(d) is a schematic diagram showing a receiver/transmitter similar to that of FIG. 7(b).

FIGS. 7(c) and 7(d) illustrate devices which correspond closely to those illustrated in FIGS. 7(a) and 7(b) respectively. In FIGS. 7(c) and 7(d) the new label applying arm of the device corresponds to that shown in the lower arm of FIG. 1. That is, a tunable laser 105 produces a signal at $f_L$ which is modulated at modulator 106 with the new label at baseband.

Figure 8:
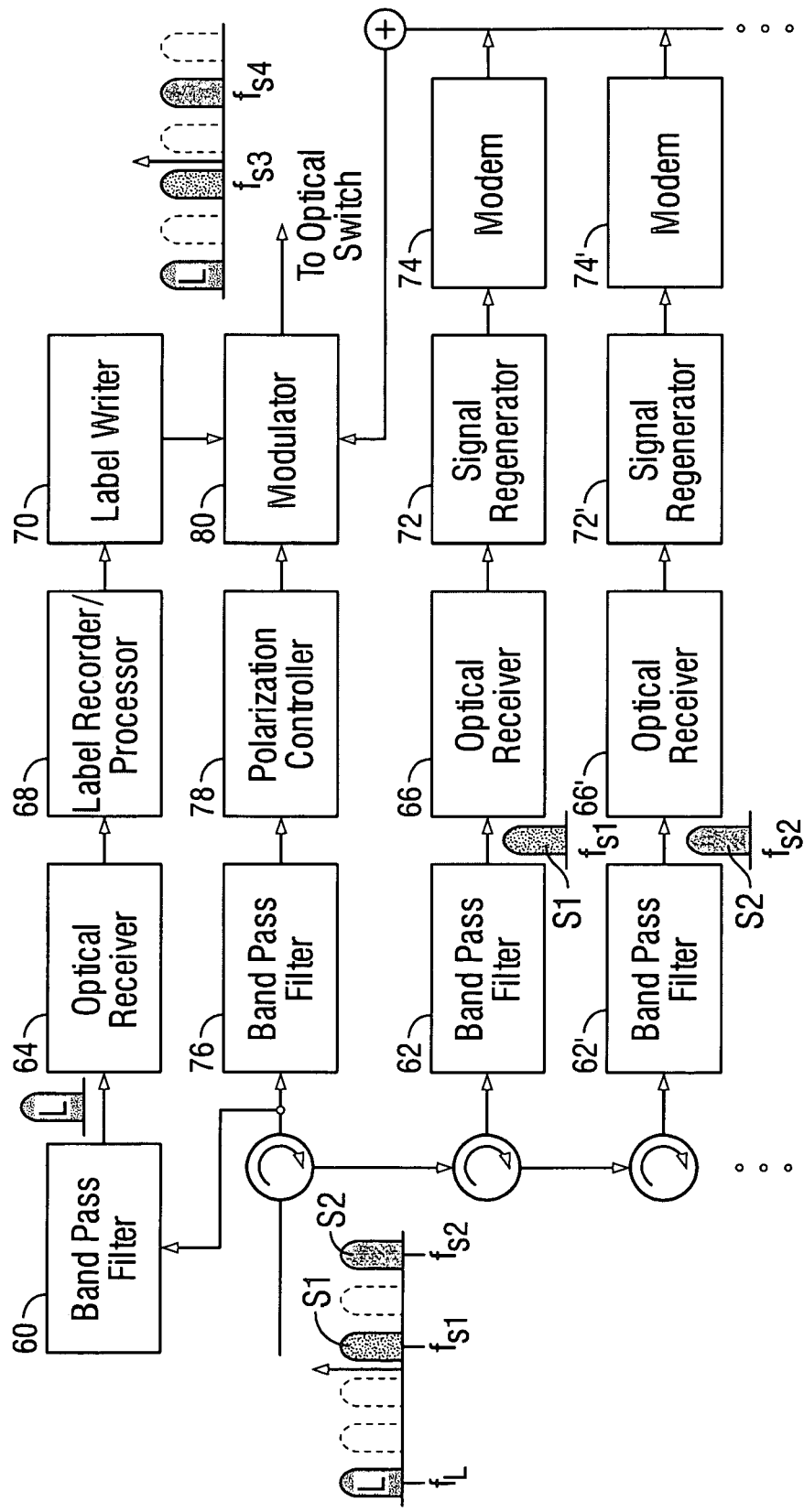
FIG. 8 is a schematic diagram showing a receiver/transmitter as in FIG. 3(a), for use in multiple channel applications, according to an embodiment of the present invention.

In FIG. 8, as in FIG. 3(a), each data channel is selected using a band pass filter 62 and remodulated using a modem 74. In this embodiment, since multiple channels are to be converted, an additional arm of the device is used, having a band pass filter 62', optical receiver 66', regenerator 72' and a microwave OSSB modem 74'. For each additional channel, an additional arm, adapted to a different frequency range, may be added on to the device in a similar fashion. The band pass filters 62, 62' should be chosen with the same considerations in mind as discussed above with respect to band pass filters 102, 33, 33'. The operation of each arm is similar to the single arm shown in FIG. 3(*a*).

Though the several elements of the illustrated devices in FIGS. 1–8 are shown to be co-located, they need not be. For example, FIG. 9 shows how the elements discussed above may be spread throughout a switching/routing node.

Figure 9:
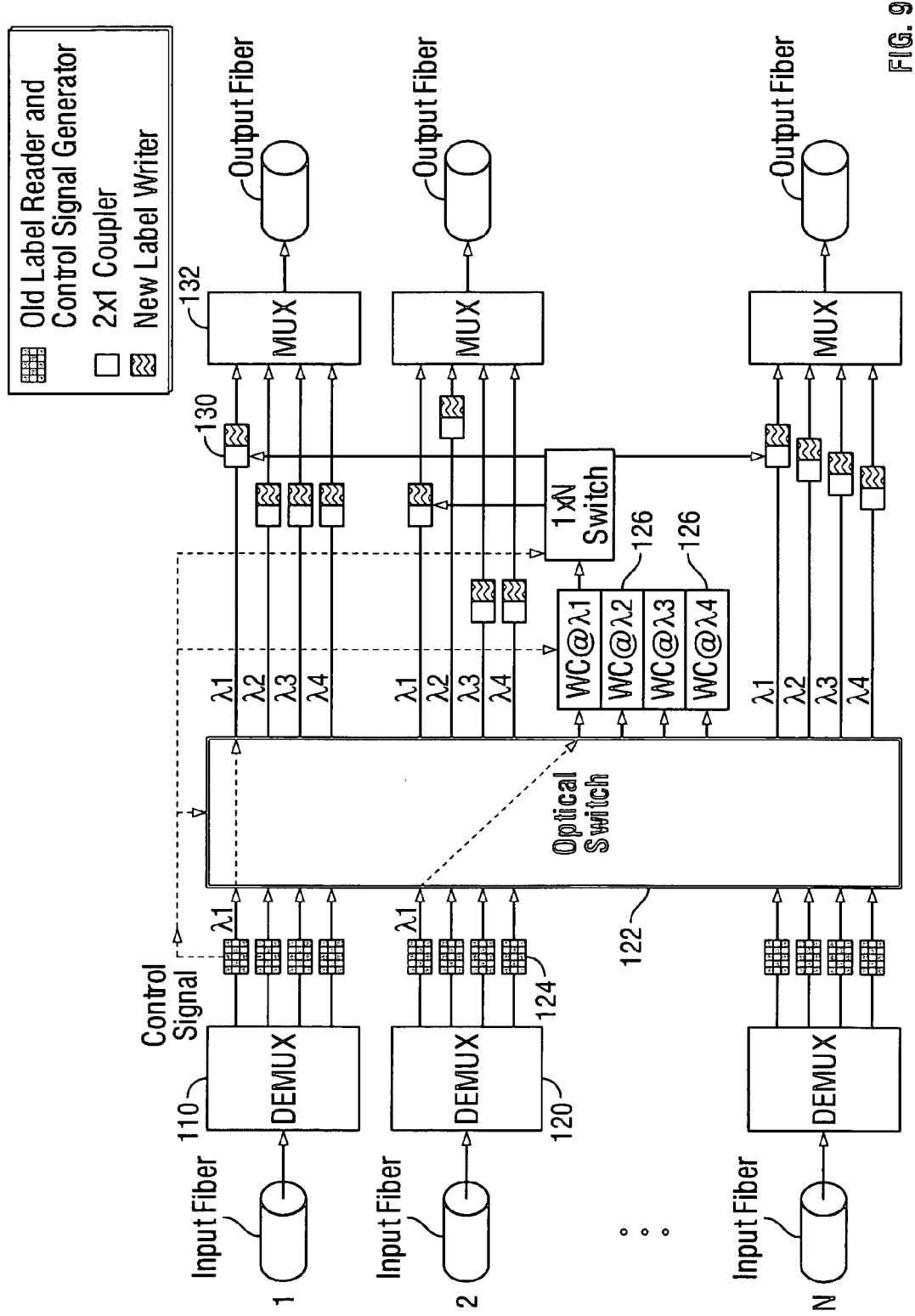
FIG. 9 is a schematic diagram showing an embodiment of the present invention in which elements are spread among portions of a switching/routing node.

In FIG. 9, multiple wavelengths of an incoming signal are demultiplexed by demultiplexers 120. The demultiplexed signals are passed to an N×(N+x) optical switch 122, wherein N=W×F, W is the number of wavelengths carried by each fiber, F is the number of fibers and x is the number of wavelength converters used in common for the fibers. The label of each signal is read by a label reader and control signal generator 124. The control signal directs which input port is to be connected to which output port of the optical switches. The control signal further controls the wavelength conversion process, in particular to select the appropriate target wavelength of each converter 126. Moreover, the control signal instructs a 1×N switch 128 to which output channel a converted channel should be output. A label writer 130 finally attaches new label information to the output signal prior to re-multiplexing at the multiplexer 132.

Figure 10:
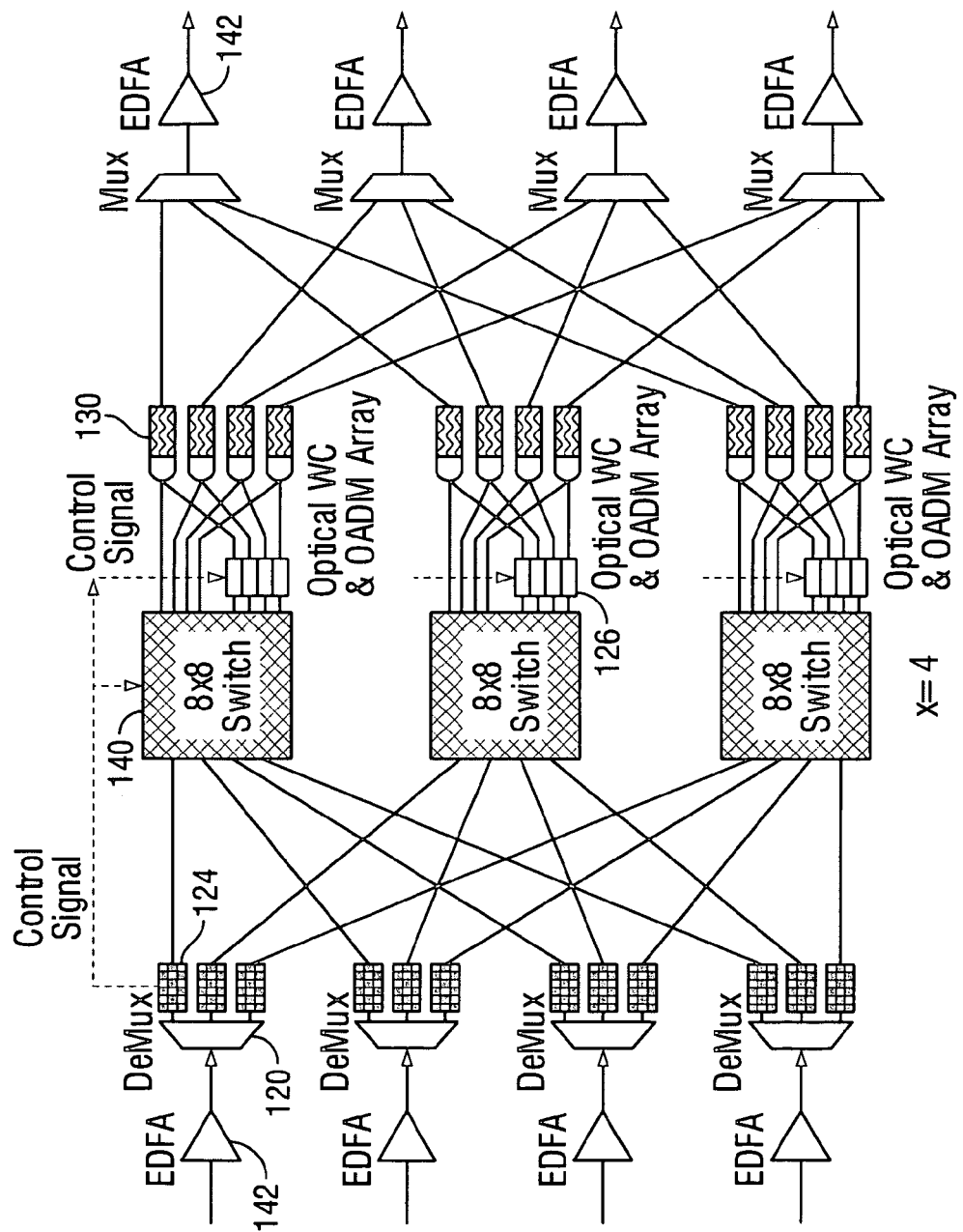
FIG. 10 is a schematic diagram showing an alternate arrangement in which elements are spread among portions of a switching/routing node.

In FIG. 10, a similar arrangement is shown. In place of the N×(N+x) optical switch 122, several smaller switches 140 are used. Further, in FIG. 10, the use of erbium doped fiber amplifiers 142 to maintain signal strength is illustrated.

Embodiments of the present invention find uses, for example, in all-optical, packet-switched networks having fast optical switches and routers in the core or circuit-switched networks with relatively slow optical cross-connects for providing traffic re-routing or protection functions. Such networks may be used as telecommunications networks carrying voice and/or data, CATV networks or other such applications.

While the invention has been described in connection with particular embodiments, it is to be understood that the invention is not limited to the disclosed embodiments, but on the contrary it is intended to cover various modifications and equivalent arrangement included within the spirit and scope of the claims which follow.

I claim:

1. A method comprising:
   receiving a first packet of information on an input optical signal that occupies a plurality of input channels, each input channel being included in one among an input plurality of distinct wavelength ranges that are respectively in selected International Telecommunication Union (ITU) WDM windows; and
   transmitting the first packet of information on an output optical signal that occupies a plurality of output channels, each output channel being included in one among an output plurality of distinct wavelength ranges,
   wherein the plurality of input channels includes at least a plurality of WDM channels within one ITU WDM window which comprise:
   (A) a reserved wavelength buffer selected from one of the plurality of adjacent WDM channels within the one ITU WDM window; and
   (B) a channel on which the first packet is received,
   wherein the plurality of output channels includes an active wavelength buffer on which the first packet is transmitted, and
   wherein each among the input plurality of wavelength ranges is associated, in order of increasing wavelength, with one among the output plurality of wavelength ranges in order of increasing wavelength, the wavelength range including the reserved wavelength buffer being associated with the wavelength range including the active wavelength buffer,
   wherein the method further comprises:
   extracting label information, the first packet of information, and a carrier from the input optical signal;
   producing a first electronic signal representing information from the first packet of information; and
   producing a second electronic signal representing the label information,
   wherein transmitting the first packet of information further comprises modulating the carrier with the first and second electronic signals to produce the output optical signal.

2. A method as in claim 1 further comprising:
   transmitting, prior to the receiving, information including the first packet on the input optical signal, the transmitting including reserving the reserved wavelength buffer.

3. A method as in claim 1, further comprising receiving an additional input optical signal having a second packet of information wherein the second packet of information is carried within the additional input optical signal over substantially the channel on which the first packet is received.

4. A method as in claim 1, further comprising:
   prior to transmitting the first packet of information on the output optical signal, extracting label information from the input optical signal, the label information including information about the first packet of information;
   generating a control signal according to at least a portion of the label information;
   controlling a signal-producing component to reproduce the first packet of information within the output optical signal in the active wavelength buffer; and
   re-associating the label information with the first packet of information.

5. A method as in claim 4, wherein the label information is carried within the input signal in a channel distinct from an input channel that carries data and distinct from the reserved wavelength buffer and within the output signal in a channel distinct from the active wavelength buffer.

6. A method as in claim 4, wherein the signal-producing component comprises:
   a local oscillator controlled by the control signal to produce a local oscillator signal, and
   a modulator, accepting as one input, the local oscillator signal, and as another input, a signal representing the first packet of information, the modulator further producing as an output, a modulated output signal including the first packet of information.

7. A method as in claim 6, wherein a frequency of the local oscillator signal corresponds to a difference in frequency between the channel on which the first packet is received and the active wavelength buffer.

8. A method as in claim 6, wherein the modulator is a Mach-Zehnder modulator.

9. A method as in claim 4, wherein the signal-producing component comprises:
   a laser, controlled according to the control signal to produce a laser signal, and
   a semiconductor optical amplifier, accepting as one input the laser signal, and as another input a signal representing the first packet of information, the semiconductor optical amplifier further producing as an output, a modulated output signal including the first packet of information.

10. A device, comprising:
an optical input port to receive a wavelength-division multiplexed (WDM) signal having a plurality of different WDM channels within each single International Telecommunication Union (ITU) WDM window, wherein at least one of the WDM channels is empty and is reserved as a buffer channel;
an optical splitter to split the received WDM signal into first, second and third optical signals;
a label processing module to process label information in the first optical signal to produce a first electrical control signal having new label information for a channel shifting arrangement;
an optical filter to filter the second optical signal to remove modulation bands thereon to produce an optical carrier signal;
a data signal regenerator to receive the third optical signal to process data in each WDM channel in the third optical signal to generate a second electrical control signal having data in the received WDM signal; and
an optical modulator to modulate the optical carrier signal in response to the first and the second electrical control signals to shift a selected WDM channel to the buffer channel according to the channel shifting arrangement to produce a new WDM signal.

11. The device as in claim 10, wherein the signal regenerator comprises:
an optical filter to filter and remove label information from the third optical signal;
an optical receiver to convert the filtered third optical signal into an electrical signal having input data;
an electronic signal regenerator to generate an electrical data signal having the input data; and
a modem to produce the second electrical control signal in response to the electrical data signal.

12. The device as in claim 11, wherein said electronic signal generator is coupled to receive an input from the label processing module and to drop input data of a selected WDM channel in response to the input.

13. The device as in claim 10, wherein the label processing module comprises:
an optical receiver to convert the first optical signal into a first signal;
a label processor to process the first signal and to produce a new label;
a label writer to produce a label writing signal in response to the new label; and
a modulator to produce the first electrical control signal in response to the label writing signal.

14. A method, comprising:
separating a received wavelength-division multiplexed (WDM) signal comprising a plurality of different WDM channels within a single International Telecommunication Union (ITU) WDM window into a first optical signal carrying a WDM channel that has label information of the WDM channels, and a second optical signal at an optical carrier frequency without WDM channels, and a third optical signal comprising WDM channels carrying data and at least one empty WDM channel which is reserved as a buffer channel;
converting the third optical signal into an electronic data signal wherein a signal channel corresponding to a selected WDM channel is shifted to a signal channel that corresponds to the buffer channel;
converting the first optical signal into an electronic label signal which has new label information to reflect updated channel information after channel shifting in the electronic data signal; and
modulating the second optical signal to produce a new optical WDM signal having WDM channels therein which carry a new label channel with the updated channel information and data.

15. The method as in claim 14, further comprising dropping data of a WDM channel and adding new data to the dropped WDM channel as a new WDM channel in the electronic data signal so that the new optical WDM signal carrying the new WDM channel.

16. The method as in claim 14, wherein the WDM signal is an optical single sideband (OSSB) modulation signal and different WDM channels and a channel carrying the label information are different modulation bands in the OSSB modulation signal, and the method comprising performing an OSSB modulation on the second optical signal to produce the new optical WDM signal.

17. A method, comprising:
receiving an optical wavelength-division multiplexed (WDM) signal having an optical carrier and WDM channels at WDM channel frequencies different from the optical carrier in an optical WDM network,
separating the received WDM signal into a first optical signal carrying a WDM channel that has label information of the input WDM signal, and a second optical signal which is the optical carrier only, and a third optical signal comprising WDM channels carrying data;
converting the first optical signal into an electronic label signal which has label information of the WDM channels in the received WDM signal;
optically filtering the third optical signal, in response to a control signal generated from the electronic label signal, to produce a filtered third optical signal that carries a selected WDM channel;
converting the filtered third optical signal into an electrical signal to extract data of the selected WDM channel and to make the selected WDM channel available for carrying data; and
modulating the second optical signal to carry a new WDM channel and a new WDM label channel, wherein the new WDM label channel includes channel information of the new WDM channel.

18. The method as in claim 17, wherein the new WDM channel and the selected WDM channel are at a same WDM channel frequency.

19. The method as in claim 17, wherein the new WDM channel and the selected WDM channel are at different WDM channel frequencies.

20. A device, comprising:
an optical input port to receive an optical wavelength-division multiplexed (WDM) signal having an optical carrier and WDM channels at WDM channel frequencies different from the optical carrier,
an optical element to separate the received optical WDM signal into first, second and third optical signals;
a label processing module to process label information of the received optical WDM signal in the first optical signal to produce a first control signal;
a first optical filter to filter the second optical signal to remove any modulation bands thereon to produce a filtered second optical signal which includes the optical carrier only;

a second optical filter to filter the third optical signal, in response to the fist control signal, to produce a filtered third optical signal that carries a selected WDM channel;

a signal regenerator to extract data of the selected WDM channel to produce a dropped signal containing the extracted data; and an optical modulator to modulate the filtered second optical signal to carry a new WDM channel and a new WDM label channel, wherein the new WDM label channel includes channel label information of the new WDM channel.

21. The device as in claim 20, wherein optical modulator modulates the filtered second optical signal to place the new WDM channel at the same WDM channel frequency as the selected WDM channel.

22. The device as in claim 20, wherein optical modulator modulates the filtered second optical signal to place the new WDM channel at a WDM channel frequency different from the selected WDM channel.

* * * * *